June 16, 1964  A. WOLF  3,137,363
METHOD FOR MULTIPLE GEOPHONE RECORDING IN SEISMIC PROSPECTING
Original Filed Oct. 28, 1957  2 Sheets-Sheet 2
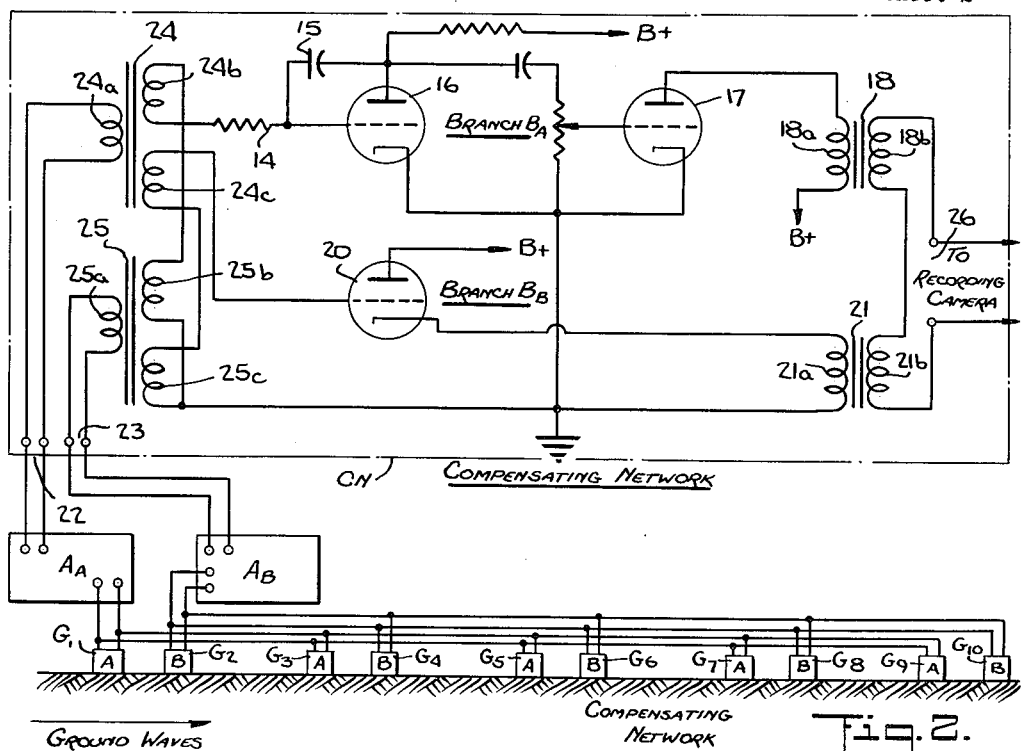
Fig. 2.
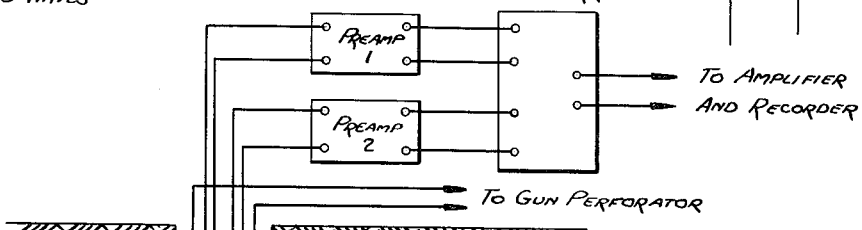
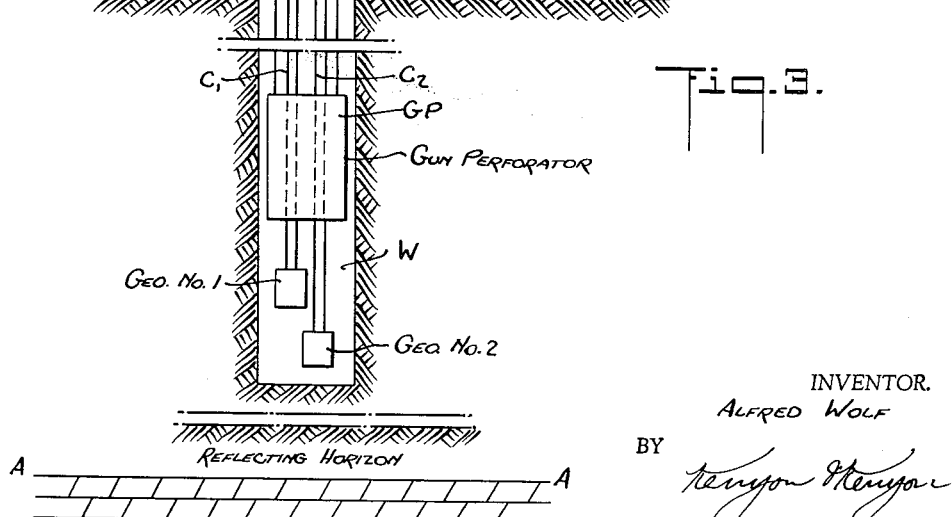
Fig. 3.
INVENTOR.
ALFRED WOLF
BY
ATTORNEYS

United States Patent Office 3,137,363
Patented June 16, 1964

3,137,363
METHOD FOR MULTIPLE GEOPHONE RECORDING IN SEISMIC PROSPECTING
Alfred Wolf, Tulsa, Okla., assignor to Geophysical Research Corporation, New York, N.Y., a corporation of New Jersey
Original application Oct. 28, 1957, Ser. No. 692,741, now Patent No. 2,993,555, dated July 25, 1961. Divided and this application May 19, 1961, Ser. No. 111,243
3 Claims. (Cl. 181—.5)

The present invention pertains generally to techniques and apparatus for seismic reflection prospecting and more particularly to multiple geophone recording systems adapted to discriminate against ground waves and thereby provide more accurate seismic records. This application is a division of Serial No. 692,741, filed October 28, 1957, now Patent No. 2,993,555.

In seismic reflection prospecting, it is the usual practice to detonate an explosive charge from a shot point near the surface of the ground and to detect the resultant earth motion at a plurality of stations set up on a line with the shot point. Generally the instruments are in the form of seismometers or geophones placed on the surface of the ground. The seismometers or geophones translate the earth motion into corresponding electrical signals, the signals being amplified, and fed to a seismic recording camera where they are made to register on a moving strip of photographically sensitive paper to produce a graphical picture of earth motion at each seismometer station. Provision is also made to record in the camera the instant of explosion and to time the record.

In one simple seismic reflection system, five geophones (or some other number) are placed at spaced positions on the earth's surface relative to a shot point, each geophone being connected through a separate amplifying channel to a recording camera which produces a record having five distinct traces. Each trace is a graphical representation of earth motion at the associated geophone station, plotted against time.

Experience has shown that the system in which one geophone is employed per channel, as described above, works well only in a few regions, and that in many instances it is necessary to develop more complex seismic patterns. The reason for this requirement is that when recording reflections from a formation interface, numerous types of ground waves are propagated from the shot point which arrive at the geophones at the same time as do reflections. Thus it becomes essential to discriminate between reflections and interfering ground waves. Where the ground waves are of high amplitude, such discrimination is difficult to effect. This complication has been recognized in the seismic prospecting art for a long time, and various expedients have heretofore been proposed for obviating it.

One known method involves filtering out the low frequency components of earth motion picked up by the geophones. The rationale for this method is the predominance of low frequency components in the ground wave disturbance. However, even when the low frequency components are eliminated, the remaining wave components are often of sufficient intensity to create serious interference with the recording of the reflected waves.

A second known method makes use of multiple geophone patterns wherein the outputs of the two or more individual geophones are combined and recorded as a single trace on the graph. Thus in the five channel seismographic system mentioned previously, in place of a single geophone in each channel, a set of five geophones may be provided placed in line with the shot point. The signals produced by the set of the five geophones in each channel are added, amplified, and then recorded. Since reflections arrive in phase coincidence at the several geophones of a single channel whereas the phase of the ground waves at the various geophone locations is not the same, reflections are reinforced whereas ground waves tend to cancel each other. While this expedient serves to reduce the effect of interfering waves in difficult areas, it is not always successful.

In my copending application entitled "Seismic Prospecting Technique," Serial No. 658,574, filed May 13, 1957, now issued as Patent 2,872,995, there is disclosed a technique wherein two matched geophones are buried at vertically spaced positions below a shot point, the geophones being responsive only to vertical earth motion. A compensating network is provided which acts to combine additively a first value representing a linear function of a portion of the sum of the outputs of the two geophones with a second value representing a portion of the same linear function of the time integral of the difference of the outputs (the lower geophone minus upper geophone). By "linear function" is meant the geophone output itself, its derivative, integral, any combination of signal derivative and integral, etc. The relative proportions of the additively combined values are adjusted to annul the effect of direct waves from the shot point, and the resultant output of the compensating network is fed through a suitable amplifier to the seismic recorder. This arrangement effects a substantial improvement in seismic recording.

In very difficult areas, where ground waves have a relatively great amplitude, the foregoing methods are sometimes insufficient to afford usable reflections. Accordingly, it is the principal object of this invention to provide a method and apparatus for seismic prospecting operative in difficult areas to minimize undesired components of earth motion at the arrival time of reflection. The invention is intended for installation in such areas in conjunction with both filtering techniques and a multiple geophone pattern, even though in principle it could be practiced with only two geophones per seismograph channels.

More specifically it is an object of the invention to provide a multiple channel seismic recording system, each channel of which includes two groups of geophones acting in conjunction with a compensating network so as to reduce substantially the disturbing effect of ground waves.

Briefly stated, in a system in accordance with the invention, each seismographic channel makes use of two groups of geophones, each group containing an equal number of geophones. The geophones of the first group are placed at spaced ground points on a line extending from the shot point, and the geophones of the second group are also placed along the same ground line, each geophone of the second group being displaced a short distance (the same for all geophone pairs) horizontally away from the shot point relative to the corresponding geophone in the first group. The displacement is less than one-quater wave length of the shortest ground wave which is to be eliminated.

The geophones of the first group are connected together, and their combined signals are amplified to provide a first output voltage. Similarly, the geophones of the second group are connected together, and their combined signals are amplified to provide a second output voltage. The first and the second output voltages are fed to a compensating network of the type set forth in the above-mentioned copending application to develop a resultant output voltage which is then fed into the camera to produce one channel trace on the seismograph record. The other channel traces are produced by identical group geophone arrangements.

For a better understanding of the invention as well as other objects and further features thereof, reference is made to the following detailed description to be read in conjunction with the acocmpanying drawings wherein like components in the several views are identified by like reference numerals.

In the drawings:

FIG. 2 is a schematic circuit diagram of one channel of the system.

FIG. 3 is a modification of the invention making use of a gun perforator.

Figure 1:
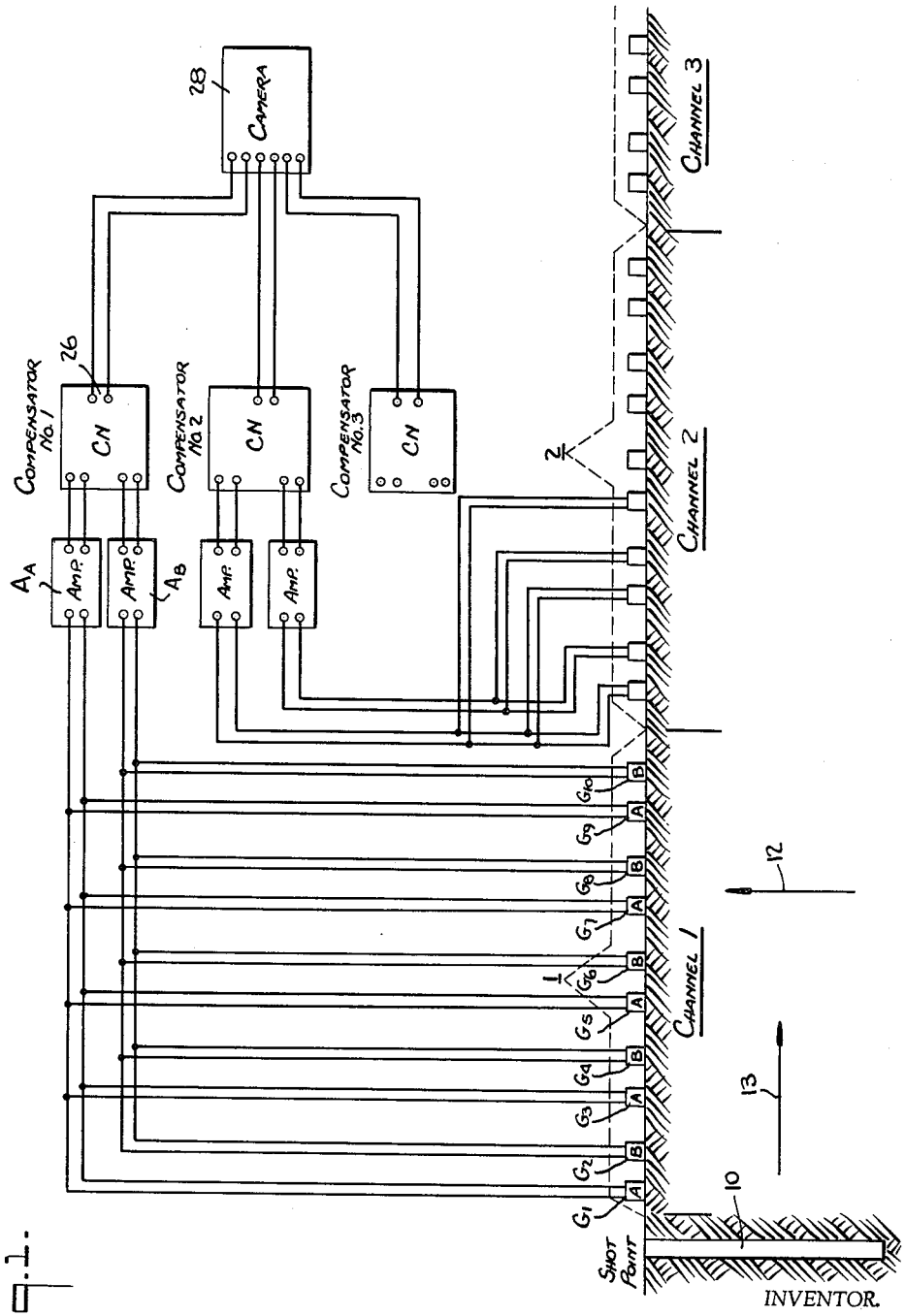
FIG. 1 is a block diagram of a seismic prospecting system in accordance with the invention.

*The Structure of the Seismic Prospecting System*

Referring now to FIG. 1, there is shown a three channel seismic prospecting system operating in conjunction with a shot hole 10 formed below the surface of the earth represented by horizontal line 11. The channels are identified by numerals 1, 2 and 3. An explosive charge is detonated in the shot hole 10 to create a localized disturbance. Seismic energy is propagated in all directions, and a portion of this energy, as represented by arrow 12, is reflected upwardly from various strata interfaces or sub-surface beds. The disturbance also produces surface waves represented by arrow 13. It is these surface waves which are to be eliminated by the invention in order to obtain accurate seismic readings.

Each of the channels 1, 2 and 3 makes use of ten geophones $G_1$ to $G_{10}$, divided equally into two groups A and B. Group A consists of the odd numbered geophones $G_1$, $G_3$, $G_5$, $G_7$ and $G_9$; group B consists of the even numbered geophones $G_2$, $G_4$, $G_6$, $G_8$ and $G_{10}$. The geophones are of identical construction and are designed to be responsive solely to vertical wave motion. As is well known, the earth is an elastic body and disturbances therein generate waves which are propagated in two distinct modes, namely, the transverse mode and the longitudinal mode. In transverse waves the direction of particle motion is normal to the direction of propagation, whereas in longitudinal waves the particle motion is parallel to the direction in which the disturbance is spreading.

A shot generates mainly longitudinal waves but these are partly transformed to transverse motion at surfaces of discontinuity. Since the geophones $G_1$ to $G_{10}$ are sensitive to vertical motion only, they do not respond to longitudinal waves travelling in the horizontal direction, whereas they respond well to longitudinal reflections arriving vertically from below.

The shot point 10 is to the left of the geophone array. The geophones in Group A are preferably equi-spaced relative to each other, and each geophone in Group B is displaced from the corresponding geophone in Group A in a horizontal direction away from the shot point by a distance which is equal for all of them, and which should be made smaller than one-quarter of a wave length of the shortest of the horizontally travelling waves (from left to right) which are to be eliminated. In practice, a displacement of between $\frac{1}{20}$ and $\frac{1}{8}$ wave lengths (10 feet–100 feet depending on conditions) should give satisfactory results. The total length of the spread from the first geophone of any one channel to the last ($G_1$–$G_{10}$ in FIG. 1) should preferably not exceed 200 feet since it is intended that reflections arrive simultaneously at all geophones of any single channel. The number of geophones employed per channel may be either greater or smaller than ten, two being a minimum and twenty a practical maximum.

The geophones of Group A are connected electrically in parallel by Lines $L_1$, and their combined electrical outputs are fed by lines $L_2$ to the input of an amplifier $A_A$. The geophones of Group B are also connected in parallel by lines $L_3$ and their combined outputs are fed by Lines $L_4$ to the input of an amplifier $A_B$. The amplifiers are of identical construction and include automatic-volume-control (A.V.C.) circuits as well as electrical filters suitable for seismic reflection work to discriminate against undesired frequency components. In addition, they are provided with volume controls which permit adjustment of the output signal voltage amplitude.

The respective signals of amplifiers $A_A$ and $A_B$ are fed by lines $L_5$ and $L_6$ to separate inputs of a compensating network CN. Network CN functions to combine additively a first value constituted by a portion of the sum of the signals with a second value constituted by the time integral of the difference of the signals. By proper adjustment of the proportion of the values being added, the effect of ground waves may be eliminated whereby only reflected waves travelling upwardly are recorded, thereby providing accurate graphical indications.

Compensating network, as shown separately in FIG. 2, includes two parallel branches $B_A$ and $B_B$. Branch $B_A$ includes an integrating network formed by resistor 14 and condenser 15, a first triode amplifying tube 16 and a second triode amplifying tube 17 whose output is coupled to an output transformer 18. The output of the first amplifying tube 16 is fed to the input of the second tube 17 through an adjustable potentiometer P. The second branch $B_B$ comprises a triode 20 arranged as a cathode follower amplifier, the cathode circuit being connected to an output transformer 21.

The output of Amplifier $A_A$ for the geophone Group A is coupled to one set of input terminals 22 of the compensating network, the output of amplifier $A_B$ for geophone Group B being coupled to a second set of input terminals 23. Input terminals 22 are connected to the primary 24a of a transformer 24 having a pair of secondary windings 24b and 24c, while input terminals 23 are connected to the primary 25a of an identically constructed transformer 25 having a pair of secondaries 25b and 25c.

The lower end of the secondary 24b is connected through resistor 14 to the grid of tube 16 in branch $B_A$, the grid being connected through condenser 15 to anode of the tube. The upper end of secondary 24b is connected to the upper end of the secondary 25b whose lower end is connected to cathode of tube 16 in Branch $B_A$, the cathode being grounded. The upper end of secondary 24c is connected to the grid of tube 20 in branch $B_B$, while the lower end is connected to the upper end of secondary 25c whose lower end is grounded. Potentiometer P is coupled capacitively between the anode of tube 16 and ground, the adjustable tap thereof being connected to the grid of tube 17 in branch $B_A$. Anode voltage for tube 16 is applied through resistor 29.

The anode of tube 17 in branch $B_A$ is connected to the one end of primary 18a of the output transformer 18, the other end of the primary being connected to an anode voltage source. The cathode of tube 20 in branch $B_B$ is connected to one end of the primary 21a of the output transformer 21, the other end of the primary being connected to ground. The anode of tube 20 is connected to an anode voltage source.

The transformer ratios of input transformers 24 and 25 are substantially one-to-one, and the interconnection of the secondaries is such that the sum of the signals from geophone Groups A and B is applied to the tube 20 in branch $B_B$, whereas the difference between the group signals is applied to the integrating network 14, 15 in branch $B_A$. Secondaries 24c and 25c are series connected in coincidence, hence the voltages therebetween are added, while secondaries 24b and 25b are connected in series opposition, hence their voltages are subtracted.

Thus the signal developed across the primary 18 of the output transformer in branch $B_A$ is proportional to the time integral of the difference of the signals generated by the two geophone groups. At the same time appearing at the primary transformer 21a of the output transformer in branch $B_B$ is a voltage proportional to the sum of the signals generated by the two geophone groups.

The secondaries 18b and 21b of the two output transformers are connected in series to the output terminals 26 of the compensating network whereby the output of the network is proportional to the sum of the voltages produced by the amplifier branches $B_A$ and $B_B$.

If the signals generated by geophone Groups A and B are denoted respectively by $e_1$ and $e_2$, the output E of the compensating network CN is proportional to:

$$E = b \int_0^t (e_2 - e_1).dt + \frac{1}{2}c(e_2 + e_1) \qquad (1)$$

where $t$ is time, $b$ and $c$ are constants depending on circuit parameters, and where $b$ can be given a wide range of values by adjusting the potentiometer P.

The time constant of the integrating circuit is equal to the product of the resistance of resistor 14 and the capacitance of capacitor 15, and the amplification of amplifier 16. A value in excess of one second is quite satisfactory, and this value is easily attained.

The output terminals 26 of compensating network CN are connected by lines $L_7$ to the conventional recording camera 28 and provision is made for indicating the time instant of the shot fired at the shot point 10. The time displacement between this instant and the reception of reflected impulses provides a key to the position of the geophysical horizons (discontinuities). The nature of the recording means is more fully disclosed in the text "Geophysical Exploration" of Heiland, pages 614 et seq., Prentice-Hall Inc., 1946.

While the two amplifiers $A_A$ and $A_B$ are disclosed as being A.V.C. types, this is not essential for the operation of the invention, for only the output volume controls on those amplifiers are strictly necessary. In practice, however, the A.V.C. feature is very convenient.

Although it is not essential to the invention, the geophones $G_1$ to $G_{10}$ are preferably of the velocity type, wherein the output is substantially proportional to earth particle velocity. They should preferably have a 20 c.p.s. resonance frequency and a damping factor equal 0.6 as ordinarily employed in seismic reflection prospecting.

The Operation of the System

The first step in the operation of the invention is the adjustment of the output volume controls of amplifiers $A_A$ and $A_B$ to give equal output amplitudes. In this connection test signals from an auxiliary generator may be applied to the input of these amplifiers and the volume controls be adjusted until like outputs are indicated in suitable output meters.

Thereafter, a succession of shots may be fired at the shot point, and reflection records made with various settings of the potentiometer P; the best reflection record is selected for mapping. The procedure may be repeated at all shot points in a given area which is being prospected. As a rule, however, the same setting of P should give satisfactory results for all shot points not too far removed from each other. In the course of taking successive shots at any shot point it may be found advisable to readjust one of the A.V.C. amplifier output controls to improve the appearance of the recorded reflections.

If a magnetic recorder is available, the firing of successive shots to determine the best setting for the potentiometer P may be avoided. In such case the output of the two A.V.C. amplifiers $A_A$ and $A_B$ is recorded separately, and the tape thus obtained is played repeatedly into the compensator CN. The adjustment of the potentiometer P is made during the playback operation.

Various other modifications of the procedure and apparatus of this invention will become apparent to geophysicists after a study of the theory of operation of the invention which follows.

We introduce a rectangular coordinate system with its origin at the shot point 10, the $z$-axis being vertical, and the positive $x$-axis extending through the geophone set-up which is in line with the shot point. Referring to FIG. 2, the positive $x$ direction runs from $G_1$ to $G_{10}$. We denote the vertical displacement of earth motion at the earth's surface $w(x,t)$ which explicitly shows it to be a function of position and time. Since, according to the specification, geophone signal output is proportional to velocity, it may be written as $s.Dw/Dt$, where $s$ is, a constant depending on geophone sensitivity, D being used for partial derivatives. Considering now the geophone pair $G_1$, $G_2$ with respective coordinates $x_1$, $x_2$, their voltage output is:

$$e_1 = s.Dw(x_1)/Dt \qquad e_2 = s.Dw(x_2)/Dt \qquad (2)$$

Since the geophones are close together, and in fact less than one-quarter wave length apart, we can write approximately:

$$w(x_2) - w(x_1) = (x_2 - x_1)Dw(x)/Dx$$
$$w(x_2) + w(x_1) = 2w(x) \qquad (3)$$

wherein the argument $x$ on the right-hand side refers to a point midway between $G_1$ and $G_2$.

The expression (1) for the voltage output of the compensator CN becomes, with the aid of Equations 2 and 3, $$E = sb(x_2 - x_1).Dw/Dx + sc.Dw/Dt \qquad (4)$$

which may be written as:

$$E = k(m.Dw/Dx + Dw/Dt) \qquad (5)$$

where $k$, $m$ are constants, and $m$ may be given a wide range of values by adjusting the potentiometer P.

Assume next that the vertical surface motion of the earth is due to reflection $f$, and to ground waves $g$, which latter are propagated outwardly from the shot point with the velocity V. Then, since reflections have the same phase for the entire geophone array of any single seismograph channel:

$$w = f(t) + g(t - x/V) \qquad (6)$$

with $Df/Dx = 0$. Postulating an adjustment of the potentiometer P of FIG. 2 such that $$m = V \qquad (7)$$

and substituting (6) in (5), it follows that:

$$E = k.Df/Dt \qquad (8)$$

which makes evident the elimination of ground waves from the compensator output, since $g$ does not appear on the right-hand side of the equation.

The same considerations can be applied with the same results to all geophone pairs in the channel, and they demonstrate that ground waves of any given velocity can be eliminated from reflection records by the use of the present invention.

In general, particularly in difficult areas, it is found that not all ground waves have the same velocity along the geophone spread. Since this invention enables us to eliminate only those of one given velocity, the adjustment of the potentiometer P should be made in a manner to annul ground waves showing the strongest interference with reflections.

After a proper setting of P has been determined empirically at a given location, it may be advantageous from a practical standpoint to keep the P setting unchanged for the whole prospect even though some improvement might be obtained by readjustment.

It is also good practice to make two records at each location, namely, one normal record with the potentiometer P set at its lowest position, and a record with P adjusted to give the best ground wave elimination.

As explained in my copending application, entitled "Seismic Prospecting Technique," Serial No. 658,574 filed May 13, 1957, now issued as Patent No. 2,872,995, any linear circuit may be included in the compensator CN, provided that both parallel branches are affected in the same way. This implies, for instance, that the integrating circuit in branch $B_A$ may be omitted, provided a differentiator is introduced in branch $B_B$.

*Drilling Well Apparatus*

Referring now to FIG. 3, there is shown an application of the method and apparatus set forth in said copending application to a situation encountered in drilling. Represented in the drawing is a well W which has been drilled by an operator to some depth above the geological horizon A—A which it is desired to reach. The problem is to determine by seismic reflection techniques the vertical distance from the bottom of the well W to the horizon A—A.

In accordance with the invention two geophones Geo No. 1 and Geo No. 2, provided with clamping devices, are spaced at short distance vertically from each other and are lowered on respective multiple conductor electrical cables $C_1$ and $C_2$ to a position adjacent the bottom of the well. In this application of the invention it may be preferable to employ seismic detectors of the pressure type responsive to pressure changes in the well fluid generated by seismic waves. When such detectors are used, the above noted clamping devices may be omitted. Supported on the cables a few hundred feet above the geophones is a gun perforator GP. A gun perforator is an instrument which may be lowered into a cased hole on an electrical cable and which fires bullets or shaped charges acting to perforate the casing. Such instruments have recently been used to provide seismic impulses in a well in connection with seismic velocity surveys. The geophones are connected through the cables and through pre-amplifiers to the compensating network CN.

The seismic impulse is excited in the earth by firing the gun perforator, and a record of geophone motion is made through the compensating network according to the method set forth in said copending application. A reflection from the geological horizon A—A provides the means for estimating its depth. The advantage of applying the invention in this situation lies in the elimination of reflections from strata above the bottom of the hole.

While there has been shown what is considered to be a preferred embodiment of the invention, it will be manifest that many changes and modifications may be made therein without departing from the essential spirit of the invention. It is intended, therefore, in the annexed claims to cover all such changes and modifications as fall within the true scope of the inevntion.

I claim:

1. The method of seismic reflection prospecting comprising the steps of creating an earth disturbance at a shot point, intercepting waves resulting from said disturbance with two groups of wave detectors placed along the ground and translating the intercepted waves into electrical signals, spacing the detectors in the first group identically relatively to that of the detectors in the second group, displacing the detectors in the second group horizontally away from the shot point relative to the first group, electrically combining the signal outputs of the detectors in the first group to produce a first voltage, electrically combining the signal outputs of the detectors in the second group to produce a second voltage, electrically adding to a portion of a linear function of the sum of the two voltages a portion of the same linear function of the time integral of the difference of said first voltage subtracted from said second voltage, and electrically adjusting the relative proportions of said additively combined voltages to annul the effect of direct waves from the shot point.

2. The method, as set forth in claim 1, wherein said horizontal displacement is less than one-quarter of a wave length of the shortest wave in said ground wave.

3. The method of seismic reflection prospecting comprising the steps of creating an earth disturbance at a shot point, intercepting waves resulting from said disturbance with two groups of wave detectors placed along the ground and translating the intercepted waves into electrical signals, spacing of detectors in the first group identically relative to that of the detectors in the second group, displacing the detectors in the second group horizontally away from the shot point relative to the first group, electrically combining the signal outputs of the detectors in the first group to produce a first voltage, electrically combining the signal outputs of the detectors in the second group to produce a second voltage, electrically adding to a portion of a linear function of the sum of the two voltages a portion of the same linear function of the time integral of the difference of said first voltage subtracted from said second voltage, electrically adjusting the relative proportions of said additively combined voltages to produce a compensated output voltage in which the effect of direct waves from the shot point are annulled, and recording the compensated output voltage to provide a seismic graph plotted against time.

References Cited in the file of this patent

UNITED STATES PATENTS

| | | |
|---|---|---|
| 2,747,172 | Bayhi | May 22, 1956 |
| 2,906,363 | Clay | Sept. 29, 1959 |
| 2,993,555 | Wolf | July 25, 1961 |